Figure 1:
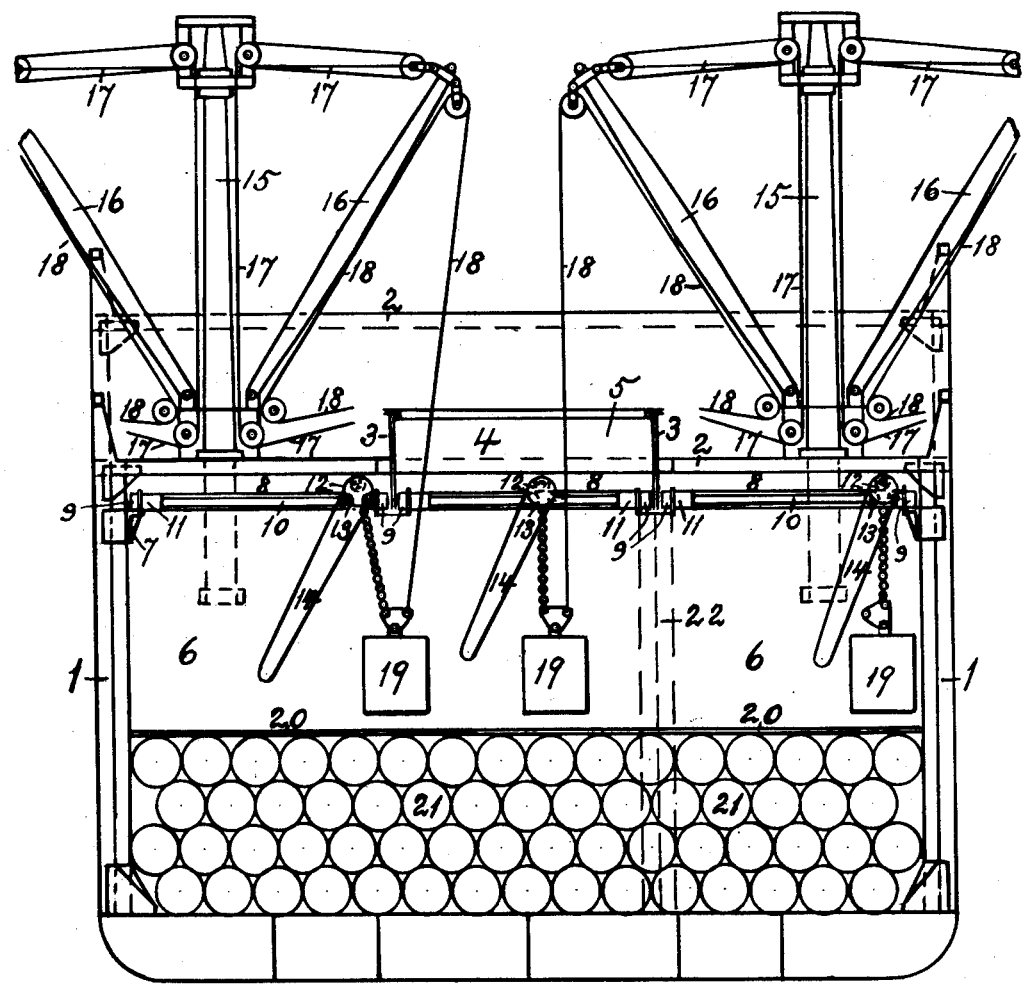

Dec. 12, 1933.  J. L. BOGERT  1,939,037
METHOD OF HANDLING CARGO IN SHIPS' HOLDS
Filed July 26, 1932  3 Sheets-Sheet 2

INVENTOR
John Lawrence Bogert.

Dec. 12, 1933.　　　J. L. BOGERT　　　1,939,037
METHOD OF HANDLING CARGO IN SHIPS' HOLDS
Filed July 26, 1932　　　3 Sheets-Sheet 3

INVENTOR
John Lawrence Bogert.

Patented Dec. 12, 1933

1,939,037

UNITED STATES PATENT OFFICE 1,939,037

METHOD OF HANDLING CARGO IN SHIPS' HOLDS

John Lawrence Bogert, Brooklyn, N. Y.

Application July 26, 1932. Serial No. 624,771

6 Claims. (Cl. 214—15)

My invention relates to the utilization of overhead cranes in the holds of vessels to transport cargo from the hatchway, through which it is lowered or raised, to and from different parts of the hold. Heretofore the standard practice in loading vessels has been to deposit the cargo at the foot of the hatchway which serves the hold, and then by means of rollers or skids to move the cargo to its proper position for stowage over the cargo already stowed. The serious drawback to this system of stowing cargo is that it involves much arduous and even dangerous labor, unless the top of the cargo already stowed is perfectly horizontal, and can support dunnage boards level and free from depressions and uprisings. The use of skids and rollers for moving certain kinds of cargo over dunnage boards is not always practical, and in many cases the cargo must be dragged from the hatchway by main strength over the dunnage on the top of the cargo already stowed.

More or less successful attempts have been made in the past to install what are known in the trade as butchers' rails, but their application has been seriously curtailed by the fact that they do not admit of any side or transverse movement, and hence cannot transport cargo except directly under the rails themselves.

The use of post cranes, mounted on pillars supporting the deck, has been suggested, but such cranes can serve only sectors of the hold radiating out from the pillars, and the necessity for bracing their jibs materially reduces the height of cargo which can be stowed under them. I am unaware of any in use at the present time.

A like serious defect, appertaining to the use of butchers' rails, was the fact that their chain hoists had to hang below the rails, and for that reason the waste space over the cargo was excessive.

In contradistinction to the foregoing my overhead cranes are true travelling cranes each of which serves at least one third of the entire hold of the vessel from bulkhead to bulkhead, and when installed in sets of three per hold renders possible overhead supported stowage in any part of said hold. Furthermore, cargo can be shifted from starboard to port, or vice-versa, while supported from above by roller bearing trolleys. Owing to careful design the vertical space taken up by these travelling cranes of mine is reduced to a minimum, so that but little hold space is sacrificed when their chain hoists have raised their lifting hooks to the highest position.

Heretofore the majority of cargo vessels have been constructed with what is called "plank sheer", which means that the main deck at bow and stern is raised above the deck level amidships. So far as the strength of a hull to withstand hogging and sagging stresses is concerned, this feature of normal design is radically wrong, as the ship's hull being a girder would economize structural material if made deeper amidships than at bow and stern, superconstructions at bow and stern could, through increased heights of forecastle and poop, secure that dryness fore and aft which is the only excuse for "sheer". If "sheer" were done away with the increased space under the deck beams would much exceed the under-deck space taken up by my cranes. In other words, if constructed without "sheer", a vessel fully equipped with my hold travelling cranes would have just as much hold capacity for the stowage of cargo as a vessel of normal design built of the same scantlings, and of equal structural strength.

The economic importance of rapidly unloading and loading a vessel must be obvious to anyone, since every hour unnecessarily spent in port is pure waste. A vessel can only be said to be earning money while in motion transporting freight. As a warehouse for the storage of goods a vessel's hold is not economical. These cranes of mine not only speed up the unloading and loading of miscellaneous cargo, but are peculiarly advantageous where package freight is being shipped in containers, and the modern trend is all in the direction of the more extended use of containers. Goods are but little subject to damage in transit if packed in suitable containers. Without containers damage claims for injuries sustained in transit have become a serious burden for ship operators. A container weighing with its contents two tons is by no means unusual, and it is perfectly obvious that, while one man might easily move a roller-bearing equipped travelling crane carrying a two ton container, it would require several men to move such a container, unsupported from above, and resting its entire weight on an uneven surface. I aim to render easier and more expeditious the loading and unloading of cargo in the holds of vessels.

To this end I make use of the constructions and mechanism disclosed in the accompanying drawings. Similar numerals refer to similar parts.

Figure 2:
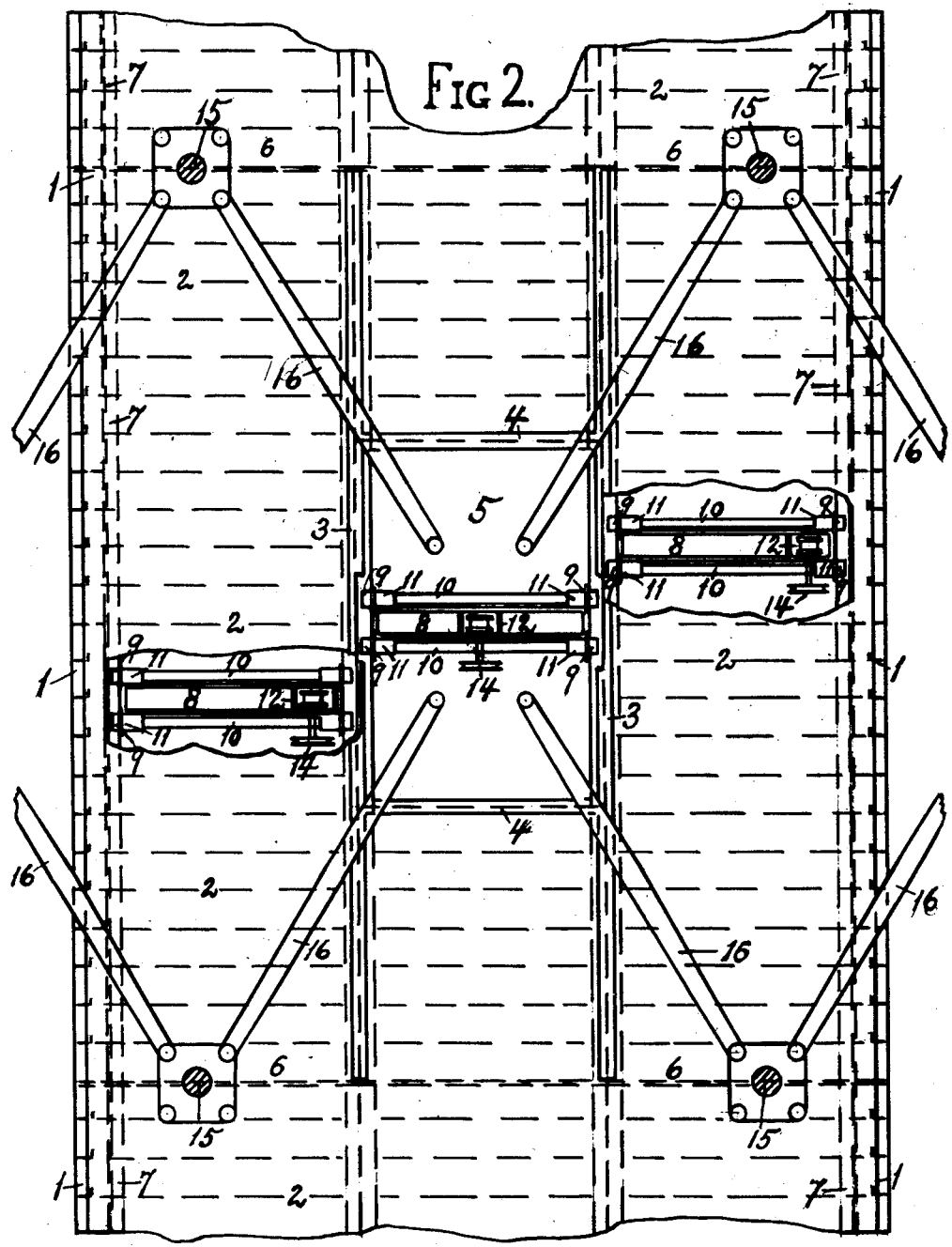
Figure 3:
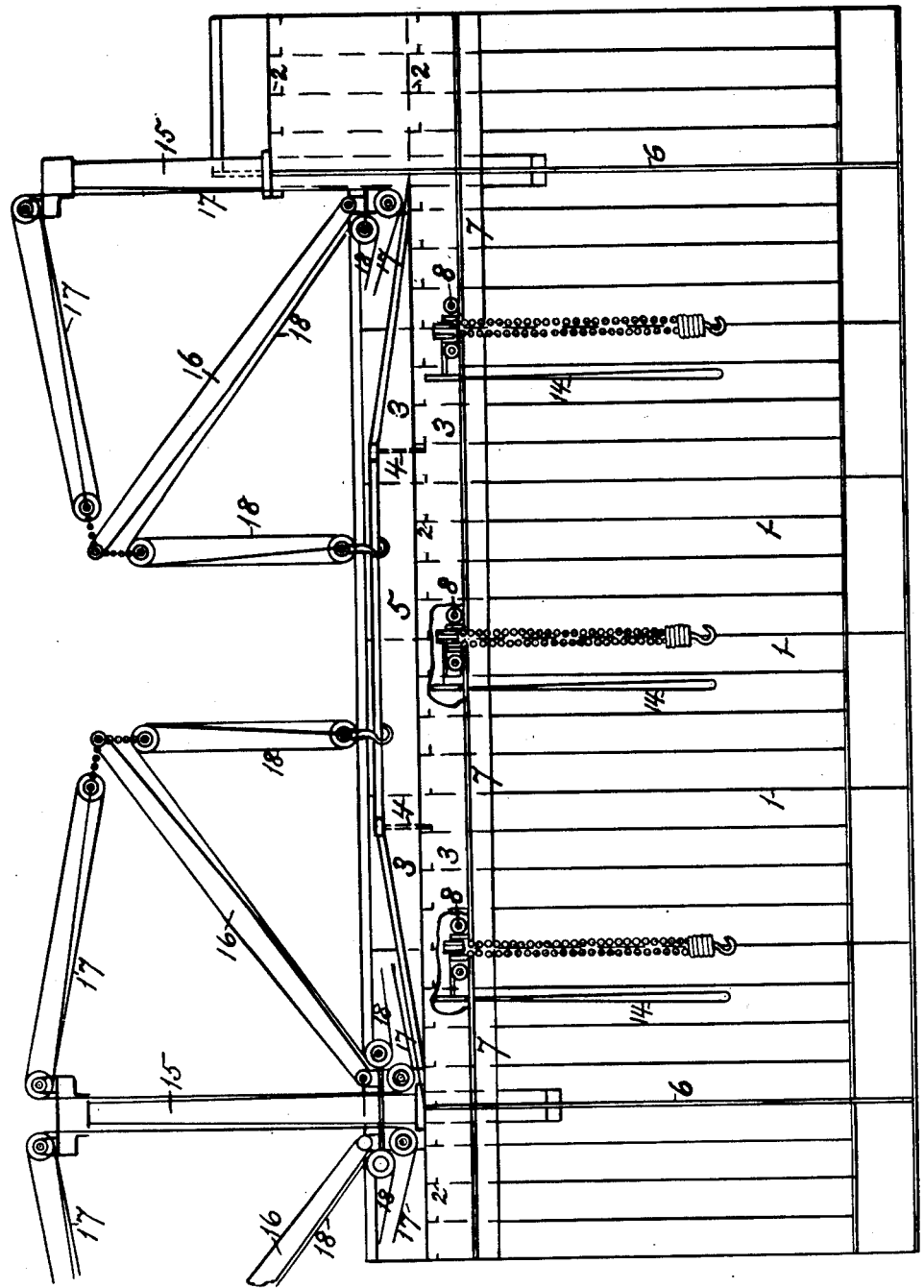

Fig. 1 shows a vertical thwartship section of the hull of a ship equipped with a set of three travelling cranes installed in accordance with my improved construction. Fig. 2 is a plan view of a portion of a hull between transverse bulkheads so equipped, and Fig. 3 is a vertical longitudinal section of a portion of a hull between transverse bulkheads so equipped. 1 is the side framing of the hull, 2 are deck beams properly secured by suitable brackets to the side framing at one end, and by suitable angle-irons to a longitudinal coaming 3 of the hatch 5. The thwartship coamings 4 of hatch 5 are stopped short even with the lower edges of main deck beams 2, while the longitudinal coamings 3 of hatch 5 extend downward below the lower edges of main deck beams by an amount sufficient to allow room for the travelling cranes 8, whose fore and aft roller wheels 9 are supported by the lower flanges of longitudinal coamings 3 and by longitudinal stringer tracks 7 properly secured to the side framing 1. By this construction it is possible for three travelling cranes to be installed in the hold of a vessel, all three moving in the same horizontal plane. I have shown flanges on the fore and aft roller-wheels 9, and these rollerwheels are firmly secured to the opposite ends of shafts 10 in pairs, to prevent slewing of cranes, which might result in their derailment. By equipping the bearings 11 of these shafts 10 with balls or roller bearings, it will be possible to move these travelling cranes 8, even when heavily loaded, with a minimum of effort. These cranes 8 carry trolleys 12 which support chain hoist drums in a frame whose roller wheels 13 may also be fitted with ball or roller bearings, so that thwartship movement of the crane trolleys can be accomplished with the minimum of effort. It is distinctly to be understood that while I have shown these travelling cranes as hand-operated cranes, there is nothing to prevent the addition of electric or other power operating mechanism save only the additional cost and complexity. I have shown a hand-wheel chain 14 by means of which the hoisting drums can be rotated to lower or raise the cargo being shifted from one part of the hold to another. 15 are the customary derricks by means of which the cargo is moved above decks to and from the hatch 5, and lowered or raised therein. The derrick-booms 16, the topping-lift rigging 17 and the purchase rigging 18 can be of any improved construction. I have not considered it necessary or desirable to show the winches that will be installed to operate the derricks, since neither they nor the details of the derricks constitute any part of my invention.

19 represent containers of any approved pattern. 20 represent dunnage boards, which are normally required to be carefully laid if heavy cargo is to be moved from the hatchway to different parts of the hold. 21 represent cargo like barrels, which under the pressure of heavy loads can easily become shifty and unstable.

It is quite evident that hold pillars, shown by dotted lines 22, will not interfere with the travelling cranes if located directly under the longitudinal coamings 3, but hold pillars are superfluous when longitudinal coamings 3 are prolonged from bulkhead to bulkhead. When moreover the longitudinal coamings are prolonged all fore and aft, they become a most important part of the strength deck, adding materially to the strength of the upper member of the ship's girder. One of the important merits of my invention is that both the side stringers 7 and the longitudinal coamings 3 are contributing factors in the strength of the hull to resist sagging and hogging, provided they are prolonged throughout the length of the ship.

Because the location of the travelling cranes and their relation to one another is most important, the deck and upper flange of the longitudinal coaming 3 have been broken thru in Fig. 2. Likewise in Fig. 3 the web of the longitudinal coaming 3 has been broken through wherever the cranes have been hidden. Strictly speaking, Fig. 3 is a longitudinal elevation of a portion of the hull of a ship with the side plating of one side removed.

My invention constitutes an improved method of handling the cargo in the hold of a vessel, since the cargo in ships as now built is supported from below while being shifted from one part of a hold to another; but in vessels embodying my improvements the cargo will be supported from above while being shifted. Furthermore, only by the use of three travelling cranes can the entire hold space be served, and can cargo be shifted from any part of the hold to any other part while supported from above.

What is claimed is:—

1. In the hold of a vessel, the combination with the side framing of the hull and the longitudinal coaming of the hatchway of rails adapted to support travelling cranes whose trolleys can transport cargo between said hatchway and various parts of said hold.

2. The combination with the cargo-handling derricks of a vessel of hatch coamings adapted to support on their lower edges wheels of travelling cranes whose trolleys can transport cargo between the hatchway of said hatch and various parts of the hold served by said hatch.

3. In the structure of a vessel, prolonging the longitudinal coamings of a hatch fore and aft, from bulkhead to bulkhead, and adapting their lower edges to support wheels of travelling cranes whose trolleys can transport cargo between the hatchway of said hatch and various parts of the hold served by said hatch.

4. In the hold of a vessel, a longitudinal stringer attached to the side framing, or incorporated therewith, whose upper surface is adapted to support wheels of travelling cranes whose trolleys can transport cargo between the hatchway of the hatch which serves said hold and various parts of the same.

5. In the hold of a vessel, installing three travelling cranes which are supported by the side framings of the hull and the longitudinal coamings of the hatch of a hatchway, the trolleys of which can receive cargo from and deliver cargo to one another, and also to and from the various parts of said hold.

6. In the hold of a vessel, installing three travelling cranes which are supported by the side framing of the hull and the longitudinal coamings of the hatch of a hatchway, the trolley of one serving the entire hold space between bulkheads of a width equal to the width of the hatchway, and the trolley of each of the other two serving the entire hold space between bulkheads of a width equal to the distance between the side framing and said hatchway.

JOHN LAWRENCE BOGERT.